United States Patent
Conant (10) Patent No.: US 10,856,171 B2
(45) Date of Patent: *Dec. 1, 2020

(54) CONTROLLED CONNECTION OF A WIRELESS DEVICE TO A NETWORK

(71) Applicant: Cirrent, Inc., San Mateo, CA (US)

(72) Inventor: Robert Conant, Burlingame, CA (US)

(73) Assignee: Cirrent, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/431,997

(22) Filed: Jun. 5, 2019

(65) Prior Publication Data

US 2019/0289490 A1 Sep. 19, 2019

Related U.S. Application Data

(63) Continuation of application No. 14/800,980, filed on Jul. 16, 2015, now Pat. No. 10,356,651.

(Continued)

(51) Int. Cl.
| | |
|---|---|
| H04W 28/02 | (2009.01) |
| H04L 12/911 | (2013.01) |
| H04W 4/60 | (2018.01) |
| H04W 40/04 | (2009.01) |
| H04W 88/16 | (2009.01) |
| H04W 40/24 | (2009.01) |

(52) U.S. Cl.
CPC ......... *H04W 28/0231* (2013.01); *H04L 47/72* (2013.01); *H04W 4/60* (2018.02); *H04W 40/04* (2013.01); *H04W 40/24* (2013.01); *H04W 88/16* (2013.01)

(58) Field of Classification Search
None
See application file for complete search history.

(56) References Cited

U.S. PATENT DOCUMENTS

| | | |
|---|---|---|
| 5,734,718 A | 3/1998 | Prafullchandra |
| 6,163,794 A | 12/2000 | Lange et al. |

(Continued)

OTHER PUBLICATIONS

Soumalainen, Smartphone Assisted Security Pairings for the Internet of Things, May 14, 2014, IEEE, 4th International Conference on Wireless Communications, Vehicular Technology, Information Theory and Aerospace & Electronic Systems (VITAE).

*Primary Examiner* — Xavier S Wong
(74) *Attorney, Agent, or Firm* — Brian R. Short (57) ABSTRACT

Methods, systems and apparatus for connecting a wireless device to a network are disclosed. One method includes automatically associating, by the wireless device, to a cloud system through a router, retrieving, by the wireless device, after automatically associating, a list of approved networks from a cloud service of the cloud system, wherein the list of approved networks includes a prioritization of the approved networks, scanning, by the wireless device, a local wireless environment, comparing, by the wireless device, a list of available networks advertised from nearby routers from the scan of a local wireless environment with the list of approved networks when the wireless device is looking for networks to join, and choosing, by the wireless device, an available network from the list of available networks advertised based at least in part on the comparing and the prioritization of the approved networks.

16 Claims, 4 Drawing Sheets

| Device | Configured Networks |
|---|---|
| #1 | Router Set A or C |
| #2 | Router Set B |
| #3 | Router Set C |

| Router Set | Approved Devices |
|---|---|
| Set A | #1 |
| Set B | #2 |
| Set C | #3 |

Table 1

| Device | Configured Networks |
|---|---|
| #1 | Router Set A or C |
| #2 | Router Set B |
| #3 | Router Set C |

| Router Set | Approved Devices |
|---|---|
| Set A | #1 |
| Set B | #2 |
| Set C | #3, #1 |

Table 2

US 10,856,171 B2

Page 2

Related U.S. Application Data (60) Provisional application No. 62/025,750, filed on Jul. 17, 2014.

(56) References Cited

U.S. PATENT DOCUMENTS

| | | | |
|---|---|---|---|
| 6,839,733 B1 | 1/2005 | Lange et al. |
| 7,117,359 B2 | 10/2006 | Wood et al. |
| 7,155,305 B2 | 12/2006 | Hayes et al. |
| 7,240,211 B2 | 7/2007 | Hillhouse |
| 7,379,778 B2 | 5/2008 | Hayes et al. |
| 7,406,596 B2 | 7/2008 | Tararukhina et al. |
| 7,484,008 B1 | 1/2009 | Gelvin et al. |
| 7,496,953 B2 | 2/2009 | Andreev et al. |
| 7,539,862 B2 | 5/2009 | Edgett et al. |
| 7,558,564 B2 | 7/2009 | Wesby |
| 7,567,510 B2 | 7/2009 | Gai et al. |
| 7,574,496 B2 | 8/2009 | McCrory et al. |
| 7,613,927 B2 | 11/2009 | Holovacs |
| 7,891,004 B1 | 2/2011 | Gelvin et al. |
| 7,949,752 B2 | 5/2011 | Lange et al. |
| 7,958,352 B2 | 6/2011 | Edgett et al. |
| 7,958,547 B2 | 6/2011 | Andreev et al. |
| 8,234,701 B2 | 7/2012 | Cheung et al. |
| 8,290,163 B2 | 10/2012 | Chang et al. |
| 8,326,914 B2 | 12/2012 | Lange et al. |
| 8,443,089 B2 | 5/2013 | Mosleh et al. |
| 8,457,622 B2 | 6/2013 | Wesby |
| 8,502,996 B2 | 8/2013 | St. Jacques, Jr. et al. |
| 8,539,247 B2 | 9/2013 | McGrew et al. |
| 8,579,189 B2 | 11/2013 | Gazdzinski |
| 8,584,221 B2 | 11/2013 | Mazur et al. |
| 8,607,330 B2 | 12/2013 | Childress et al. |
| 8,622,286 B2 | 1/2014 | Gazdzinski |
| 8,627,416 B2 | 1/2014 | Keeler et al. |
| 8,640,944 B1 | 2/2014 | Gazdzinski |
| 8,689,297 B2 | 4/2014 | Pasquero et al. |
| 8,743,778 B2 | 6/2014 | Gordon et al. |
| 8,769,642 B1 | 7/2014 | O'Neill et al. |
| 8,819,851 B1 | 8/2014 | Johansson |
| 8,869,236 B1 | 10/2014 | Tonogai et al. |
| 8,875,261 B2 | 10/2014 | Delia et al. |
| 8,880,054 B2 | 11/2014 | Wesby |
| 8,909,928 B2 | 12/2014 | Ahmad et al. |
| 8,955,080 B2 | 2/2015 | Brunswig et al. |
| 8,955,082 B2 | 2/2015 | Mazur et al. |
| 8,984,589 B2 | 3/2015 | Liu |
| 9,009,815 B2 | 4/2015 | Pieczul et al. |
| 9,043,458 B2 | 5/2015 | Balaji et al. |
| 9,053,310 B2 | 6/2015 | Oberheide et al. |
| 9,064,278 B2 | 6/2015 | Fan et al. |
| 9,077,703 B1 | 7/2015 | Goshen et al. |
| 9,088,556 B2 | 7/2015 | Truskovsky et al. |
| 9,088,627 B2 | 7/2015 | Nelson et al. |
| 9,118,662 B2 | 8/2015 | Corrion |
| 9,137,108 B2 | 9/2015 | Rezvani et al. |
| 9,167,053 B2 | 10/2015 | Marmolejo-Meillon et al. |
| 9,172,606 B2 | 10/2015 | Rezvani et al. |
| 9,191,874 B2 | 11/2015 | Marmolejo-Meillon et al. |
| 9,231,981 B2 | 1/2016 | Delia et al. |
| 9,256,722 B2 | 2/2016 | Saxman et al. |
| 9,264,905 B2 | 2/2016 | Ferguson-Jarnes et al. |
| 9,270,654 B2 | 2/2016 | Marmolejo-Meillon et al. |
| 9,332,018 B2 | 5/2016 | Liebl, III et al. |
| 9,332,069 B2 | 5/2016 | Aahlad et al. |
| 9,332,579 B2 | 5/2016 | Scherer et al. |
| 9,356,962 B2 | 5/2016 | Ilieva et al. |
| 9,378,601 B2 | 6/2016 | Ricci |
| 9,384,339 B2 | 7/2016 | Griffin et al. |
| 9,397,990 B1 | 7/2016 | Taly et al. |
| 9,418,257 B2 | 8/2016 | Wassingbo |
| 9,420,045 B2 | 8/2016 | Marmolejo-Meillon et al. |
| 9,426,653 B2 | 8/2016 | Becker et al. |
| 9,445,146 B2 | 9/2016 | Fan et al. |
| 9,454,656 B2 | 9/2016 | Oberheide et al. |
| 9,479,503 B2 | 10/2016 | Griffin et al. |
| 9,494,694 B1 | 11/2016 | Dong et al. |
| 9,497,187 B2 | 11/2016 | Griffith et al. |
| 9,537,857 B1 | 1/2017 | Koved et al. |
| 9,563,413 B2 | 2/2017 | Chan et al. |
| 9,584,507 B1 | 2/2017 | Koved et al. |
| 9,602,503 B2 | 3/2017 | Saxman et al. |
| 9,628,472 B1 | 4/2017 | Koved et al. |
| 9,667,710 B2 | 5/2017 | Wilbur et al. |
| 9,672,071 B2 | 6/2017 | Gerganov |
| 9,686,682 B2 | 6/2017 | Kim et al. |
| 9,705,878 B2 | 7/2017 | Havercan |
| 9,712,513 B2 | 7/2017 | Trevathan et al. |
| 9,713,003 B2 | 7/2017 | Kim et al. |
| 9,742,750 B2 | 8/2017 | Obasanjo et al. |
| 9,742,763 B2 | 8/2017 | Neuman et al. |
| 9,773,051 B2 | 9/2017 | Smith |
| 9,779,404 B2 | 10/2017 | Spencer, II |
| 9,830,589 B2 | 11/2017 | Xing |
| 9,843,624 B1 * | 12/2017 | Taaghol ............. H04L 41/0803 |
| 9,847,964 B2 | 12/2017 | Logue |
| 10,070,313 B2 | 9/2018 | Schrecker |
| 10,102,510 B2 | 10/2018 | Yau et al. |
| 10,143,053 B1 | 11/2018 | Wilson et al. |
| 10,154,409 B2 * | 12/2018 | Conant ................ H04L 63/107 |
| 10,181,985 B1 | 1/2019 | Passaglia et al. |
| 2003/0101359 A1 | 5/2003 | Aschen et al. |
| 2003/0105810 A1 | 6/2003 | McCrory et al. |
| 2003/0191949 A1 | 10/2003 | Odagawa |
| 2004/0122687 A1 | 6/2004 | Creamer et al. |
| 2004/0250118 A1 | 12/2004 | Andreev et al. |
| 2005/0159823 A1 | 7/2005 | Hayes et al. |
| 2005/0226423 A1 | 10/2005 | Li et al. |
| 2005/0228874 A1 | 10/2005 | Edgett et al. |
| 2005/0268330 A1 | 12/2005 | Di Rienzo |
| 2006/0191005 A1 | 8/2006 | Muhamed et al. |
| 2006/0259183 A1 | 11/2006 | Hayes et al. |
| 2006/0259184 A1 | 11/2006 | Hayes et al. |
| 2007/0174901 A1 | 7/2007 | Chang et al. |
| 2008/0159536 A1 | 7/2008 | Chang et al. |
| 2008/0189774 A1 | 8/2008 | Ansari et al. |
| 2008/0198866 A1 * | 8/2008 | Shahar ................ H04L 47/245 |
| | | 370/412 |
| 2008/0271123 A1 | 10/2008 | Ollis et al. |
| 2009/0126000 A1 | 5/2009 | Andreev et al. |
| 2009/0150525 A1 | 6/2009 | Edgett et al. |
| 2009/0320098 A1 | 12/2009 | Roberts et al. |
| 2010/0100948 A1 | 4/2010 | Delia et al. |
| 2010/0127854 A1 | 5/2010 | Helvick et al. |
| 2010/0217837 A1 | 8/2010 | Ansari et al. |
| 2011/0029782 A1 | 2/2011 | Havercan |
| 2011/0040870 A1 | 2/2011 | Wynn et al. |
| 2011/0047603 A1 | 2/2011 | Gordon et al. |
| 2011/0099616 A1 | 4/2011 | Mazur et al. |
| 2011/0138048 A1 * | 6/2011 | Dawson ................ H04L 67/327 |
| | | 709/226 |
| 2011/0225648 A1 | 9/2011 | Channakeshava |
| 2011/0243553 A1 | 10/2011 | Russell |
| 2011/0265147 A1 | 10/2011 | Liu |
| 2011/0313922 A1 | 12/2011 | Ben Ayed |
| 2011/0314294 A1 | 12/2011 | McGrew et al. |
| 2012/0060213 A1 | 3/2012 | Childress et al. |
| 2012/0110650 A1 | 5/2012 | Van Biljon et al. |
| 2012/0131653 A1 | 5/2012 | Pasquero et al. |
| 2012/0173356 A1 | 7/2012 | Fan et al. |
| 2012/0230304 A1 | 9/2012 | Barbu et al. |
| 2012/0243686 A1 | 9/2012 | Wesby |
| 2012/0260320 A1 | 10/2012 | Keeler et al. |
| 2012/0302219 A1 | 11/2012 | Vang |
| 2012/0329429 A1 | 12/2012 | Jabara et al. |
| 2013/0007520 A1 | 1/2013 | Giammarresi et al. |
| 2013/0013767 A1 | 1/2013 | Stober et al. |
| 2013/0046982 A1 | 2/2013 | Suh et al. |
| 2013/0097306 A1 | 4/2013 | Dhunay |
| 2013/0191231 A1 | 7/2013 | Gazdzinski |
| 2013/0206835 A1 | 8/2013 | Gazdzinski |
| 2013/0268687 A1 | 10/2013 | Schrecker |
| 2013/0269020 A1 | 10/2013 | Griffin et al. |
| 2013/0311597 A1 | 11/2013 | Arrouye et al. |
| 2013/0339489 A1 | 12/2013 | Katara et al. |

(56) References Cited

U.S. PATENT DOCUMENTS

| | | |
|---|---|---|
| 2014/0026193 A1 | 1/2014 | Saxman et al. |
| 2014/0068261 A1 | 3/2014 | Malek et al. |
| 2014/0075514 A1 | 3/2014 | Prasad et al. |
| 2014/0108019 A1 | 4/2014 | Ehsani et al. |
| 2014/0137261 A1 | 5/2014 | Chen et al. |
| 2014/0156715 A1 | 6/2014 | Lee et al. |
| 2014/0165150 A1 | 6/2014 | Brunswig et al. |
| 2014/0172947 A1 | 6/2014 | Ghai et al. |
| 2014/0181948 A1 | 6/2014 | Mazur et al. |
| 2014/0189004 A1 | 7/2014 | Aahlad et al. |
| 2014/0201517 A1 | 7/2014 | Corrion |
| 2014/0282939 A1 | 9/2014 | Pieczul et al. |
| 2014/0289195 A1 | 9/2014 | Chan et al. |
| 2014/0289391 A1 | 9/2014 | Balaji et al. |
| 2014/0306833 A1 | 10/2014 | Ricci |
| 2014/0325591 A1 | 10/2014 | Delia et al. |
| 2014/0337291 A1 | 11/2014 | Dorman et al. |
| 2014/0337937 A1 | 11/2014 | Truskovsky et al. |
| 2014/0373096 A1 | 12/2014 | Obasanjo et al. |
| 2014/0375437 A1 | 12/2014 | Rezvani et al. |
| 2014/0380453 A1 | 12/2014 | Alonso Cebrian et al. |
| 2015/0007273 A1 | 1/2015 | Lin |
| 2015/0024710 A1 | 1/2015 | Becker et al. |
| 2015/0038074 A1* | 2/2015 | Buckley ............... H04B 5/0031 455/41.1 |
| 2015/0046990 A1 | 2/2015 | Oberheide et al. |
| 2015/0058406 A1 | 2/2015 | Rezvani et al. |
| 2015/0074275 A1* | 3/2015 | Ashley ................ H04L 47/70 709/226 |
| 2015/0074582 A1 | 3/2015 | Shearer |
| 2015/0074670 A1 | 3/2015 | Gerganov |
| 2015/0074743 A1 | 3/2015 | Ilieva et al. |
| 2015/0089597 A1 | 3/2015 | Srinivasan et al. |
| 2015/0095999 A1 | 4/2015 | Toth |
| 2015/0142947 A1 | 5/2015 | Dyba et al. |
| 2015/0143486 A1 | 5/2015 | Hartmann |
| 2015/0195099 A1 | 7/2015 | Imes et al. |
| 2015/0237031 A1 | 8/2015 | Neuman et al. |
| 2015/0244694 A1 | 8/2015 | Lin et al. |
| 2015/0261782 A1 | 9/2015 | McFerrin et al. |
| 2015/0281955 A1 | 10/2015 | Zhang |
| 2015/0288694 A1 | 10/2015 | Liebl, III et al. |
| 2015/0312041 A1 | 10/2015 | Choi |
| 2015/0317151 A1 | 11/2015 | Falcy et al. |
| 2015/0356328 A1 | 12/2015 | Wassingbo |
| 2015/0378658 A1 | 12/2015 | Mandigo et al. |
| 2016/0021538 A1 | 1/2016 | Conant et al. |
| 2016/0021607 A1 | 1/2016 | Conant |
| 2016/0024823 A1 | 1/2016 | McAndrew |
| 2016/0044032 A1 | 2/2016 | Kim et al. |
| 2016/0063491 A1 | 3/2016 | Steeves |
| 2016/0066183 A1 | 3/2016 | Conant et al. |
| 2016/0080343 A1 | 3/2016 | Robinton |
| 2016/0081133 A1 | 3/2016 | Kim et al. |
| 2016/0087966 A1 | 3/2016 | Saxman et al. |
| 2016/0088478 A1 | 3/2016 | Kim et al. |
| 2016/0105314 A1 | 4/2016 | Logue |
| 2016/0112434 A1 | 4/2016 | Chung et al. |
| 2016/0173487 A1 | 6/2016 | Griffith et al. |
| 2016/0210429 A1 | 7/2016 | Ortiz et al. |
| 2016/0212113 A1 | 7/2016 | Banerjee |
| 2016/0212141 A1 | 7/2016 | Banerjee |
| 2016/0217638 A1 | 7/2016 | Child et al. |
| 2016/0219044 A1 | 7/2016 | Karunakaran et al. |
| 2016/0219319 A1 | 7/2016 | Servignat et al. |
| 2016/0227371 A1 | 8/2016 | Wang et al. |
| 2016/0234186 A1 | 8/2016 | Leblond et al. |
| 2016/0249395 A1 | 8/2016 | Logue et al. |
| 2016/0255080 A1 | 9/2016 | Griffin et al. |
| 2016/0261411 A1 | 9/2016 | Yau et al. |
| 2016/0269398 A1 | 9/2016 | Chhabra et al. |
| 2016/0275731 A1 | 9/2016 | Prasad et al. |
| 2016/0277374 A1 | 9/2016 | Reid et al. |
| 2016/0295364 A1 | 10/2016 | Zakaria |
| 2016/0308954 A1 | 10/2016 | Wilbur et al. |
| 2016/0323257 A1 | 11/2016 | Kang et al. |
| 2016/0337334 A1 | 11/2016 | Murr |
| 2016/0337354 A1 | 11/2016 | Smadja |
| 2016/0344862 A1 | 11/2016 | Tucker |
| 2016/0359837 A1 | 12/2016 | Krstic et al. |
| 2016/0359847 A1 | 12/2016 | Griffith et al. |
| 2016/0359863 A1 | 12/2016 | Krstic et al. |
| 2016/0366233 A1 | 12/2016 | Le et al. |
| 2016/0381023 A1 | 12/2016 | Dulce et al. |
| 2017/0005820 A1 | 1/2017 | Zimmerman et al. |
| 2017/0026369 A1 | 1/2017 | Hao et al. |
| 2017/0026380 A1 | 1/2017 | Liebl, III et al. |
| 2017/0026465 A1 | 1/2017 | Aahlad et al. |
| 2017/0026902 A1* | 1/2017 | Roskind ............... G06F 21/604 |
| 2017/0034142 A1 | 2/2017 | Camenisch et al. |
| 2017/0041316 A1 | 2/2017 | Setchell |
| 2017/0048172 A1 | 2/2017 | Chavez |
| 2017/0070504 A1 | 3/2017 | Ramachandran et al. |
| 2017/0078398 A1 | 3/2017 | Haidar et al. |
| 2017/0085575 A1 | 3/2017 | Wynn et al. |
| 2017/0093587 A1 | 3/2017 | Glisson |
| 2017/0094706 A1 | 3/2017 | Kim et al. |
| 2017/0099281 A1 | 4/2017 | Trevathan et al. |
| 2017/0104738 A1 | 4/2017 | Brown |
| 2017/0111335 A1 | 4/2017 | Hibbert et al. |
| 2017/0150535 A1 | 5/2017 | Wynn et al. |
| 2017/0169422 A1 | 6/2017 | Ye et al. |
| 2017/0171747 A1 | 6/2017 | Britt et al. |
| 2017/0180347 A1 | 6/2017 | Koved et al. |
| 2017/0180530 A1 | 6/2017 | Tucker |
| 2017/0181054 A1 | 6/2017 | DeCerbo, Jr. |
| 2017/0181114 A1* | 6/2017 | Lu ....................... H04W 72/087 |
| 2017/0195331 A1 | 7/2017 | Wu et al. |
| 2017/0195332 A1 | 7/2017 | Wu et al. |
| 2017/0200001 A1 | 7/2017 | Bhullar et al. |
| 2017/0213206 A1 | 7/2017 | Shearer |
| 2017/0213212 A1 | 7/2017 | Dicker et al. |
| 2017/0213305 A1 | 7/2017 | Smith et al. |
| 2017/0243195 A1 | 8/2017 | Xing |
| 2017/0257426 A1 | 9/2017 | Wilbur et al. |
| 2017/0272316 A1 | 9/2017 | Johnson et al. |
| 2017/0277872 A1 | 9/2017 | Mercury et al. |
| 2017/0279614 A1 | 9/2017 | Mercury et al. |
| 2017/0279793 A1 | 9/2017 | Trevathan et al. |
| 2017/0288872 A1 | 10/2017 | Lu et al. |
| 2017/0295065 A1 | 10/2017 | Jain et al. |
| 2017/0324728 A1 | 11/2017 | Gilpin et al. |
| 2017/0337813 A1 | 11/2017 | Taylor |
| 2017/0339065 A1 | 11/2017 | Li et al. |
| 2017/0339436 A1 | 11/2017 | Buono et al. |
| 2017/0357936 A1 | 12/2017 | Byington et al. |
| 2017/0372091 A1 | 12/2017 | Lacey |
| 2018/0091975 A1 | 3/2018 | Schrecker |
| 2018/0191867 A1 | 7/2018 | Siebel et al. |

* cited by examiner

| Device | Configured Networks |
|---|---|
| #1 | Router Set A or C |
| #2 | Router Set B |
| #3 | Router Set C |

| Router Set | Approved Devices |
|---|---|
| Set A | #1 |
| Set B | #2 |
| Set C | #3 |

Table 1

| Device | Configured Networks |
|---|---|
| #1 | Router Set A or C |
| #2 | Router Set B |
| #3 | Router Set C |

| Router Set | Approved Devices |
|---|---|
| Set A | #1 |
| Set B | #2 |
| Set C | #3, *#1* |

Table 2

CONTROLLED CONNECTION OF A WIRELESS DEVICE TO A NETWORK

RELATED APPLICATIONS

This patent application is a continuation of U.S. patent application Ser. No. 14/800,980, filed Jul. 16, 2015, which claims priority to U.S. Provisional Patent Application No. 62/025,750, filed Jul. 17, 2014, entitled "Method and System for Federated Device Cloud," which are incorporated herein by reference.

FIELD OF THE DESCRIBED EMBODIMENTS

The described embodiments relate generally to wireless networking. More particularly, the described embodiments relate to methods, systems and apparatuses for controlling a connection of a wireless device to a network.

BACKGROUND

Binding and provisioning devices to a network can be technically complicated. Methods like WiFi Protected Setup were developed to address this challenge, but fail to simplify the process sufficiently to allow seamless connectivity for connected devices.

It is desirable to have a system, method and apparatus for controlling a connection of a wireless device to a network that provides binding and provisioning of the wireless device to the network.

SUMMARY

An embodiment includes a method for connecting a wireless device to a network. The method includes automatically associating, by the wireless device, to a cloud system through a router, retrieving, by the wireless device, after automatically associating, a list of approved networks from a cloud service of the cloud system, wherein the list of approved networks includes a prioritization of the approved networks, scanning, by the wireless device, a local wireless environment, comparing, by the wireless device, a list of available networks advertised from nearby routers from the scan of a local wireless environment with the list of approved networks when the wireless device is looking for networks to join, and choosing, by the wireless device, an available network from the list of available networks advertised based at least in part on the comparing and the prioritization of the approved networks.

Another embodiment includes a wireless device. The wireless device includes a wireless interface, and a controller. The controller operative to automatically associate to a cloud system through a router, retrieve after automatically associating, a list of approved networks from a cloud service of the cloud system, wherein the list of approved networks includes a prioritization of the approved networks, scan a local wireless environment, compare a list of available networks advertised from nearby routers from the scan of a local wireless environment with the list of approved networks when the wireless device is looking for networks to join, and choose an available network from the list of available networks advertised based at least in part on the comparing and the prioritization of the approved networks.

Other aspects and advantages of the described embodiments will become apparent from the following detailed description, taken in conjunction with the accompanying drawings, illustrating by way of example the principles of the described embodiments.

DETAILED DESCRIPTION

The described embodiments include systems, methods, and apparatuses for connecting a wireless device to a network. At least some embodiments provide for simplification of provisioning and onboarding of the wireless device through coordination of the device manufacturer and the network equipment manufacturer.

At least some embodiments includes a connected wireless device (a wireless device that has internet connectivity), an access point or router (the device that allows joining of a network, for example a WiFi router in a home), a device cloud application (the software application, which may be owned and operated by the connected wireless device manufacturer, that connects to the device), the federated device cloud application (which may be run as a service by an operator), and the internet (providing connectivity from the access point or router to the wireless device connected application).

At least some of the described embodiments make it dramatically easier to connect internet-enabled products to wireless networks. Many of these devices (such as, Wi-Fi-enabled printers, lightbulbs, and/or kitchen appliances) do not have a rich user interface with a screen and keyboard, so it is difficult to configure these devices to connect to the wireless network. At least some of the described embodiments create a way to instantly and securely connect devices to the internet.

Figure 1:
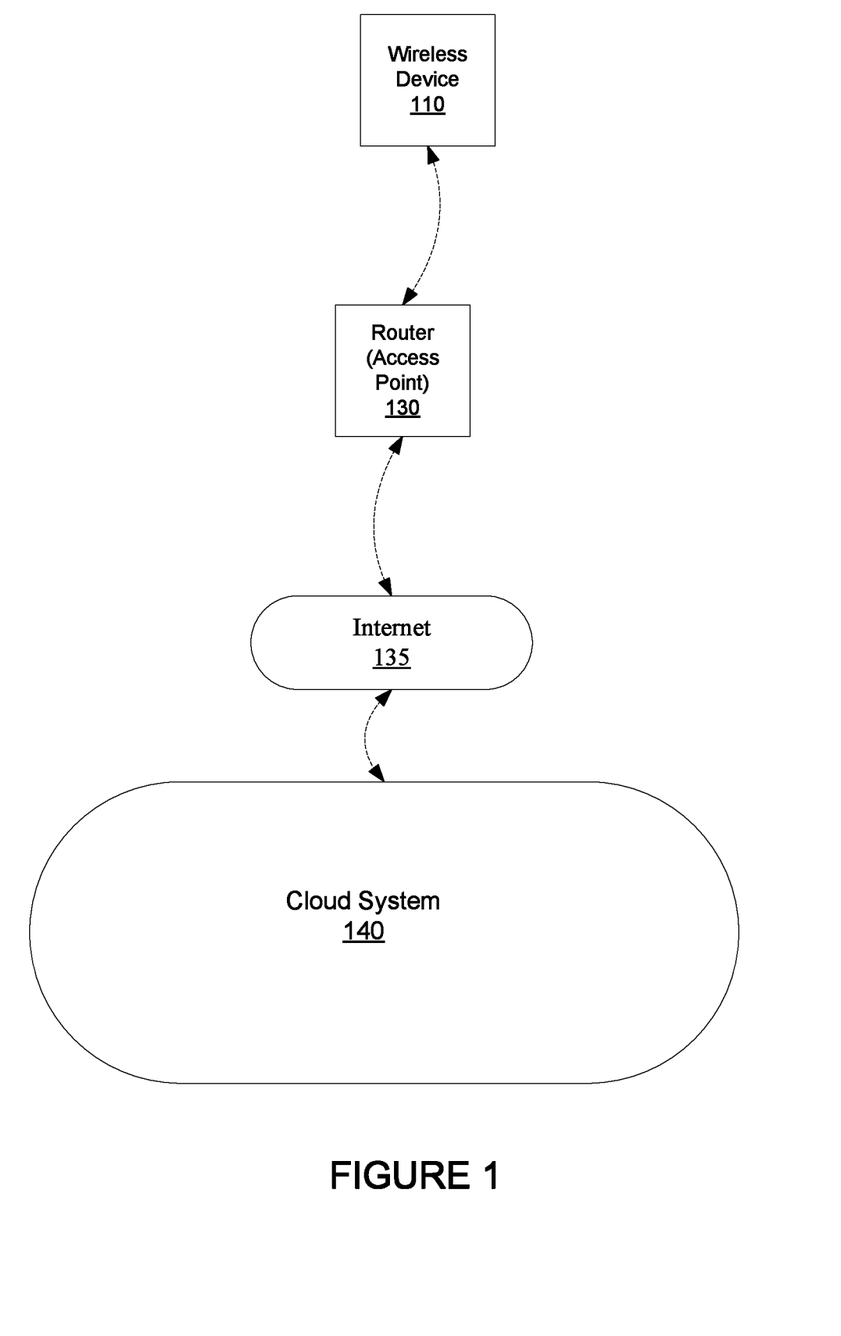
FIG. 1 shows a system for connecting a wireless device to a network, according to an embodiment.

FIG. 1 shows a system for connecting a wireless device 110 to a network, according to an embodiment. For an embodiment, the wireless device 110 automatically requests association to a router 130. Further, for at least some embodiments, a cloud system 140 receives an authentication request from the router 130, wherein the router 130 received the authentication request from the wireless device 110. Further, for at least some embodiments, the cloud system 140, returns a response to the authentication request to the router 130, wherein the response includes internet domains and connection bandwidths the wireless device is allowed to use, wherein the wireless device has been preconfigured with credentials that are also preconfigured into the cloud system. As shown, for an embodiment, the cloud system 140 is connected to the router 130 through, for example, the internet 130.

For at least some embodiments, the cloud system 140 includes one or more servers, and one or more databases. The databases include information on the wireless devices, the pre-shared keys and certificates, the access plans for the devices, the internet domains that the devices are allowed to communicate with, the networks that the devices are allowed to join, and the connection bandwidth parameters of the devices. The servers of the cloud system 140 receive the authentication requests from the routers and devices, and use the data in the database to decide whether to authenticate the device, and what internet domains and connection bandwidth parameters should be passed back to the router.

For at least some embodiments, the authentication request includes the negotiation of a set of security keys to secure the transmission of the wireless device credentials (pre-shared key or certificate). For an embodiment, the authentication process includes mutual authentication of the router and the cloud system through the use of digital certificates or a shared secret.

For an embodiment, the authentication process includes the router 130 redirecting the wireless device 110 to a captive portal, which resides on a server separate from the cloud system 140, and which negotiates the authorization and authentication process on behalf of the router 130 before passing the connection bandwidths and internet domain parameters back to the router 130.

For an embodiment, the authentication process include the router 130 implementing firewall rules on the router 130 to prevent the wireless device 110 from connecting to domains that are not on the list of approved domains.

For an embodiment, the authentication process includes the router 130 implementing bandwidth limitations on the device connection which prevents the wireless device 110 from communicating outside the range of these bandwidth limitations.

At least some embodiments include a manufacturer of the wireless device 110 registering the wireless device 110 with the cloud system 140, and agreeing upon a credential for the wireless device 110. For an embodiment, the credential includes a pre-shared key (password) or a digital certificate. For an embodiment, the credentials are stored on non-volatile memory of the wireless device 110.

Further, for an embodiment, the manufacturer also specifies the internet domains the wireless device 140 needs to connect to, and chooses a data access plan, which may include connection bandwidths. For an embodiment, the connection bandwidth may include an upstream and/or downstream bandwidth, a duration of the connection, a total time on the network, an aggregate bandwidth of over time, and/or an aggregate data cap (for example 1 gigabyte per month). As will be described, for an embodiment, the connection bandwidth is adaptively adjusted.

For at least some embodiments, the cloud service 140 is coordinated with a set of wireless routers in homes of users that allow access to the internet if the wireless devices of the users are approved by the cloud service.

For an embodiment the cloud system 140 is connected to the router 130 via a proxy cloud system. The proxy cloud system in this case routes the authentication requests to the cloud system 140 based on the realm identified in the device credentials.

For at least some embodiments, the connection bandwidth is adaptively adjusted based on a variety of different parameters, including business agreements, available bandwidth, the service level agreed with the device manufacturer, the service level agreed with the router operator, the service level agreed with the internet service subscriber, the time of day, the amount of data the device has already used, the historical data usage of the wireless device 110, or other variables.

For at least some embodiments, the manufacturer puts the credential and the network configuration on the wireless device 110 when the wireless device 110 is manufactured. The network configuration defines the set of networks the wireless device 110 should try to join. For an embodiment, the network configuration is updated periodically, and the wireless device 110 receives, for example, the updated network configurations from time to time over the internet.

For an embodiment, the network configuration is updated based on new business relationships, aggregated or historical network performance data, network performance data from specific routers, or other variables.

For at least some embodiments, when the wireless device 110 is powered up (power turned on) by a user, the wireless device 110 automatically attempts to connect to one of the wireless networks included in the network configuration. When the device attempts to connect, the router (such as, router 130) the wireless device 110 is attempting to connect to queries the cloud service (of the cloud system 140) to authenticate the wireless device 110 and authorize the wireless device 110 to join the network. For an embodiment, the cloud service (of the cloud system 140) sends back to the router 130 allowed parameters of the connection. For an embodiment, the allowed parameters include the domains the wireless device 110 is allowed to access and the bandwidth and other connection parameters.

As described, at least some embodiments address some of the biggest security risks for wireless-connected products. The wireless device(s) are given access to the internet—but only very limited access, because the domains the wireless devices are allowed to connect to is limited to the domains preconfigured by the device manufacturer. This prevents devices from being hacked and used as part of denial-of-service and other security attacks.

At least some of the described embodiments provide users a way to use internet-connected devices that may not be trusted. The devices are joining the wireless network, but are not authorized to communicate with other devices in the local network—they are specifically bound to communicate only with the specified internet domains. This feature allows for safe, secure zero-touch joining. Further, because the device joins the wireless network automatically, and because the user may wish to have the device on a different, secure wireless network, there is some complexity on the device in managing the network configurations and the connections to the various networks.

For an embodiment, a wireless connection manager (WCM) that operates on the wireless device dynamically decides whether the wireless device should join the user's (user of the wireless device) secure personal network or the authorized network (the network that device is allowed to join through authentication from the cloud service of the cloud system). For an embodiment, the wireless connection manager prioritizes a secure personal network, but opting to use the network which is authorized by the cloud service of the cloud system if network performance of the secure personal network falls below a threshold level. For an embodiment, the wireless connection manager of the wireless device selects to send at least some data on a secure personal network, and send at least some other data on the network which is authorized by the cloud service of the cloud system. The partitioning of network connectivity across time and across data sources or data types can be done dynamically by the device, and can be directed by the cloud system or by configurations pulled by the device from the cloud system. That is, an embodiment includes dynamically partitioning between the sending of the at least some data on the secure personal network, and the sending the at least some other data on the network authorized by the cloud service of the cloud system, wherein the dynamic partitioning is performed by either the wireless device or by the cloud system.

For an embodiment, the WCM is software that runs on the wireless device 110 to manage the wireless connection and configuration. The WCM uses the network configuration to decide which network to join. If a user wants the wireless device 110 to connect on a different network, the WCM prioritizes that network, and stays connected to it if possible. It can fall back to another network if the preferred network is not available. For at least some embodiments, the WCM includes device code that manages the automatic joining the network.

Further, for an embodiment, the WCM may also include software to upload wireless network performance or technical information to the cloud service 140. The WCM can upload information such as network traffic patterns, availability or visibility of wireless networks, network performance parameters, device communication parameters, device usage data, device logs, or other device data.

For an embodiment, the WCM also updates the cloud service 140 with the real time status of the wireless device 110. This status may include information about the network the device is connected to such as the network name, router MAC address, and signal strength.

As previously described, at least some of the described embodiments make it dramatically easier to connect internet-enabled products to wireless networks. Many of these devices (such as, Wi-Fi-enabled printers, lightbulbs, and/or kitchen appliances) do not have a rich user interface with a screen and keyboard, so it is difficult to configure these devices to connect to the wireless network. At least some of the described embodiments create a way to instantly and securely connect devices to the internet.

Figure 2:
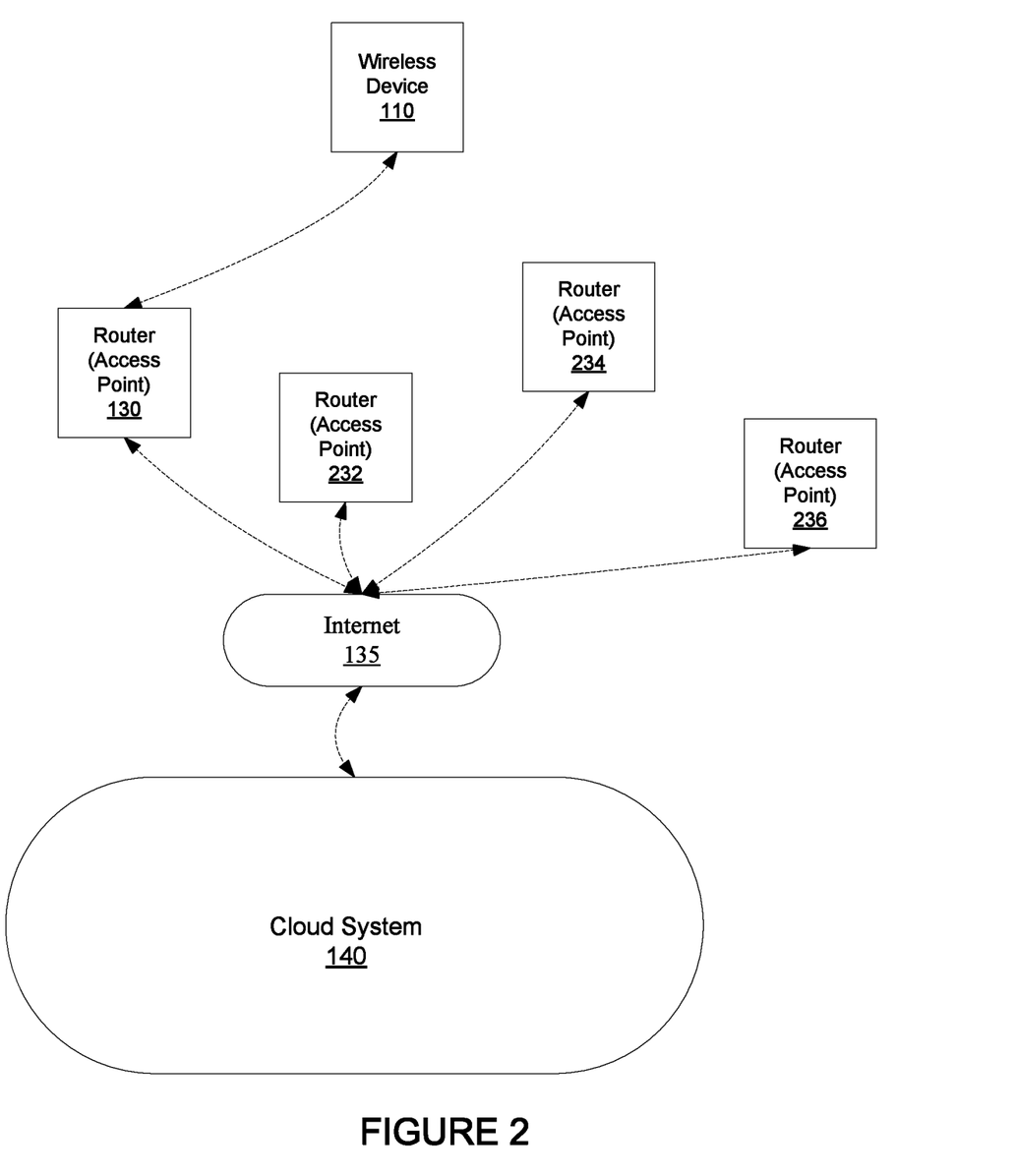
FIG. 2 shows another system for connecting a wireless device to a network, according to an embodiment.

FIG. 2 shows another system for connecting a wireless device to a network, according to an embodiment. For an embodiment the router 130 is one of a plurality of routers 232, 234, 236 that the wireless device 110 is operable to attempt to associate with, and wherein the plurality of routers that wireless device 110 is operable to associate with is adaptively updated at the wireless device.

For at least some embodiments, the wireless device 110 periodically retrieves a list of approved networks from a cloud service of the cloud system 140, wherein the list of approved networks includes a prioritization of the approved networks. When the wireless device 110 looks for networks to join, the wireless device 110 compares the list of available networks advertised from nearby routers from a scan of a local wireless environment with the list of approved networks, and chooses the highest priority network that is available to be joined. By updating the list of approved networks on the cloud service of the cloud system 140, the wireless device 110 is adaptively updated to associate with a specific set of routers.

For an embodiment, the adaptive updating is done based on a number of criteria including cost, network performance, device connectivity success rate, bandwidth, limitations on the connection parameters, limitations on the domains, signal strength, or other network parameters. For example, the wireless device could periodically update its connection information to the cloud system, and if the device repeatedly falls off of a particular network or has communications trouble on a particular network, the cloud system could update the network configuration to lower the priority of that network. That is, for an embodiment, the cloud service of the cloud system 140 adaptively updates the list of approved networks, wherein adaptive updating includes lowering a priority of an approved network if the wireless device repeatedly has problems communicating with the approved network.

For an embodiment the router 130 is one of a plurality of routers 130, 232, 234, 236 that the wireless device 110 is allowed to authenticate against, and wherein the plurality of routers 130, 232, 234, 236 that the wireless device 110 is allowed to authenticate against is adaptively updated in the cloud system 140.

For at least some embodiments, the cloud system 140 is configured to specify which devices are allowed to join which routers. For at least some embodiments, when a router sends a message to the cloud service of the cloud system 140 to authenticate a specific wireless device, the cloud service approves or rejects that request based on this configuration. For at least some embodiments, this configuration is dynamically updated to change which wireless devices can successfully associate with which routers.

For an embodiment, this configuration for approving devices on a router is done based on a number of different parameters including connectivity cost, network performance, network bandwidth, business relationships between the entity that designs, builds, or sells the device and the company that designs, builds, sells, or operates the router. For an embodiment, this configuration is updated over time as these parameters or relationships change.

An embodiment includes preconfiguring the internet domains and the connection bandwidth into the cloud system 140. For at least some embodiments, the internet domains and connection bandwidth configurations, which are stored in the cloud system, can be modified over time—even after a device has been deployed.

For an embodiment, this modification is done manually by an operator of the cloud system 140, based on business priorities or technical metrics like bandwidth or network performance. For an embodiment, these modifications are done automatically by analysis of the wireless device 110 or network performance, as monitored by the wireless device 110 or the cloud system 140.

For at least some embodiments, the internet domains and connection bandwidth parameters are updated at any time in the cloud system 140. When a wireless device attempts to associate with a router, and the router sends the authentication request to the cloud system 140, the cloud system 140 dynamically determines the domains and connection bandwidth configuration. For at least some embodiments, this configuration is updated at any time, and the new parameters are sent to the router the next time the wireless device attempts to associate.

This allows device manufacturers to provide dynamic services to their customers by expanding the network capability of the devices, to remotely turn on a network connection for a specific device or set of devices. For example, a kitchen appliance company makes a Wi-Fi connected appliance. The appliances are configured at the time of manufacture to connect only to the cloud service. If the appliance manufacturer receives a warranty claim or a service call, they can dynamically provision a direct connection to the device by adding an additional internet domain to the provisioned connection for the device. This allows the appliance manufacturer to communicate directly to the device to identify what is wrong. This can reduce the cost of providing service, eliminate field service calls, and enable better customer support.

For an embodiment, the cloud system 140 is preconfigured to accept authentication requests from the router. For an embodiment, the cloud system is configured to only accept authentication requests from a specific set of routers. By rejecting authentication requests from non-approved routers, the cloud system 140 eliminates some security vulnerabilities around repeated retries of passwords. For an embodiment, this pre-configuration can be periodically changed as a company rolls out new routers, or as old routers are removed from service.

For an embodiment, the router is configured to send the authentication request to the cloud system 140. For an embodiment, the deployed routers are configured to send authentication requests to the cloud system 140, either by provisioning a specific internet domain or IP address. For an embodiment, the routers are configured through software at the time of manufacture, or through a configuration or software update while in the field. This configuration tells the router that devices that attempt to associate should be authenticated and authorized by the cloud service 140.

For at least some embodiments, the cloud service (of the cloud system 140) is configured to and updated to allow or disallow specific wireless devices to associate with specific routers. For an embodiment, this configuration happens in two places: in the wireless device through its network configuration, and in the cloud service through the authorization process.

Figure 3:
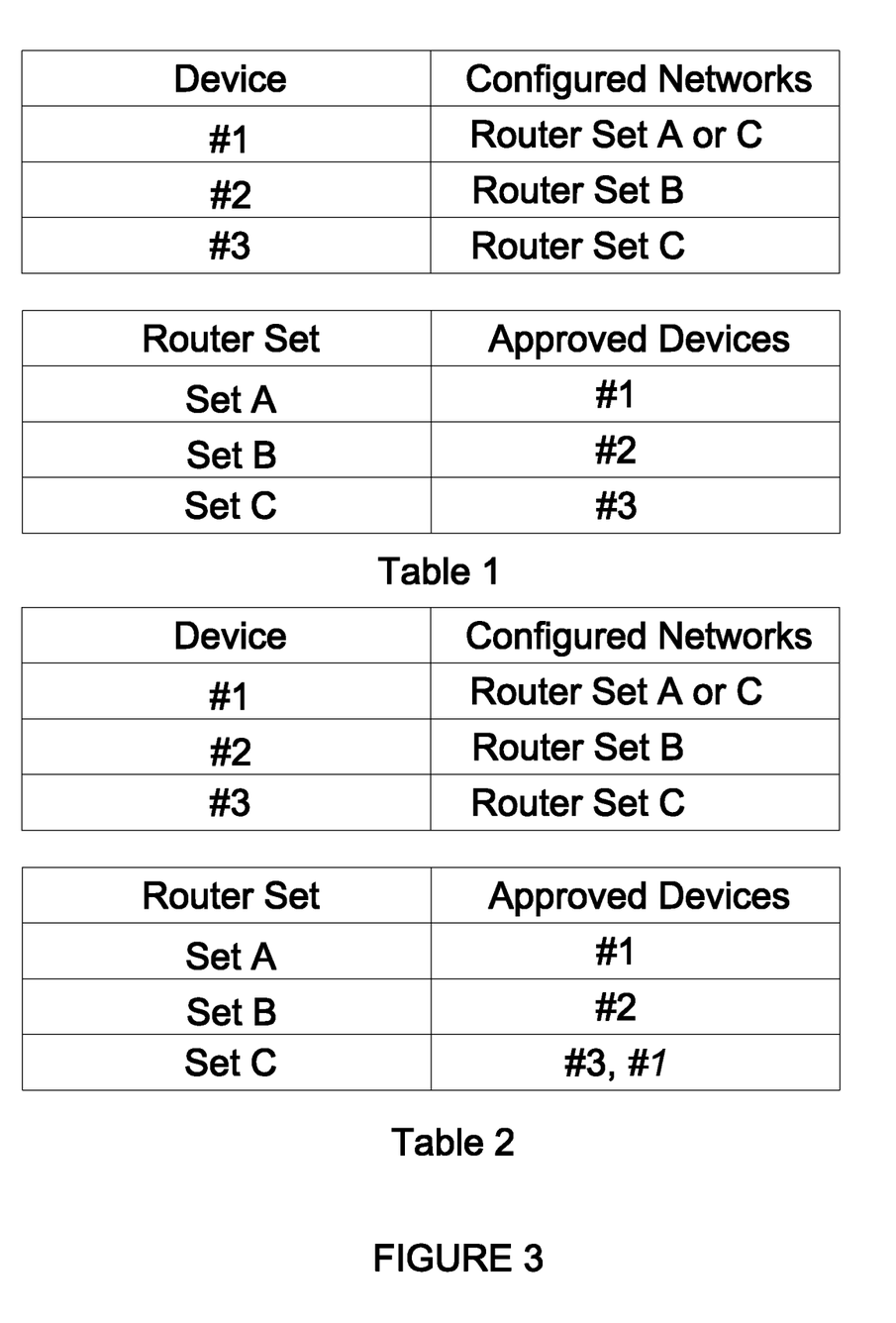
FIG. 3 shows tables that depicts wireless device and router configurations, according to an embodiment.

FIG. 3 shows tables that depicts wireless device and router configurations, according to an embodiment. As shown in Table 1 of FIG. 3, there may be Devices (#1, #2, and #3) and three sets of Routers (set A, set B, and set C). The Devices and Routers may be configured as shown in the table 1 of FIG. 3.

In this case Device #1 may try to join Router Set A or Router Set C, but will only be approved to join Router Set A. This configuration can be dynamically changed in the Cloud System to update the network configurations on the devices, and to update which Router Sets the devices are approved to connect to. For example the configuration above may be updated as shown by Table 2 of FIG. 3, wherein Device #1 is allowed to join Router Set C.

The parties involved in operating the system includes the User (the person who owns the access point (router) and the connected device), the ISP (internet service provider, which provides connectivity services to the user), the connected device manufacturer (which manufactures the connected device and associated cloud software), and the FDC operator.

Figure 4:
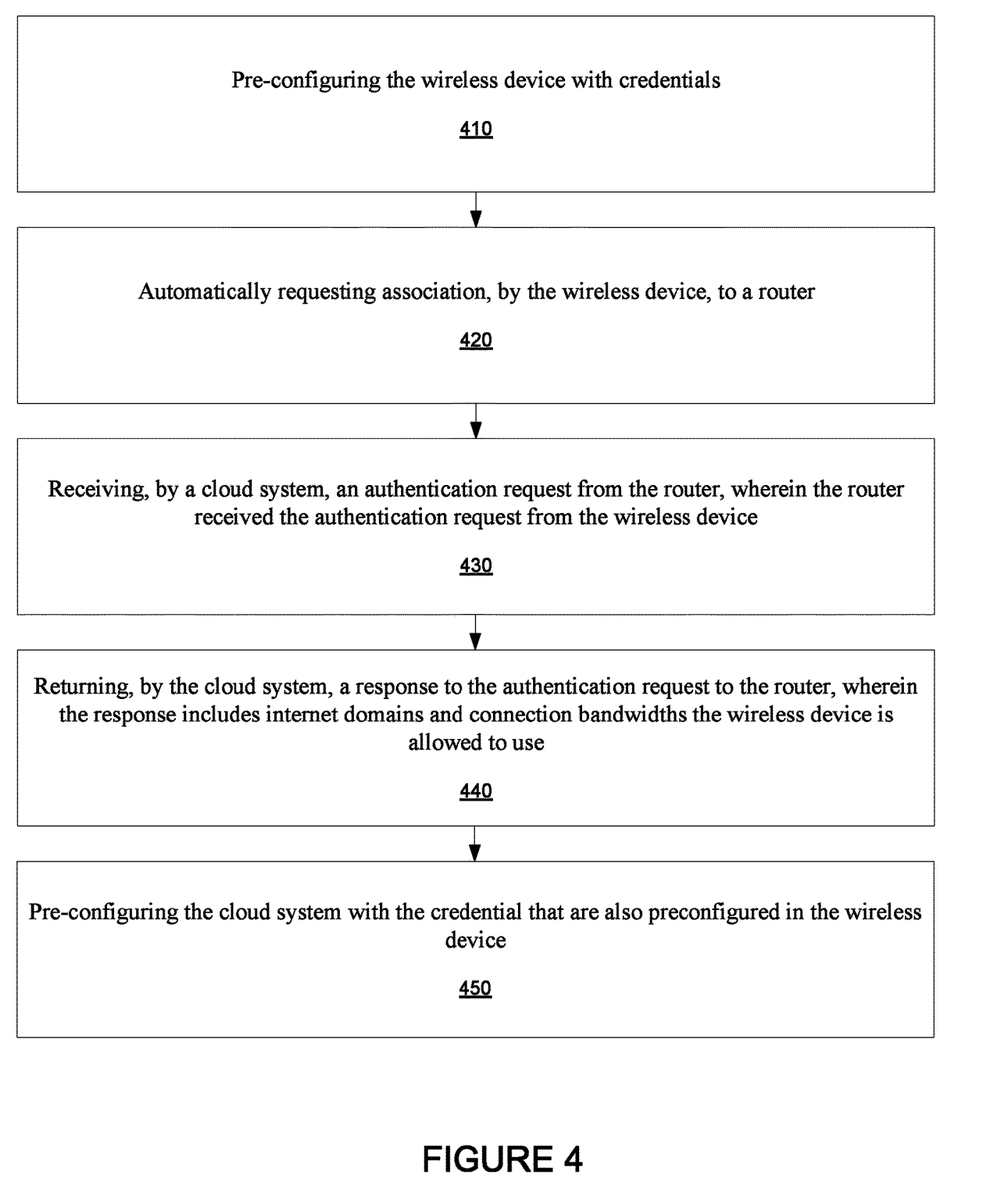
FIG. 4 is a flow chart that includes steps of an example of a method of connecting a wireless device to a network, according to an embodiment.

FIG. 4 is a flow chart that includes steps of an example of a method of connecting a wireless device to a network, according to an embodiment. A first step 410 includes preconfiguring the wireless device with credentials. A second step 420 includes automatically requesting association, by the wireless device, to a router. A third step 430 includes receiving, by a cloud system, an authentication request from the router, wherein the router received the authentication request from the wireless device. A fourth step 440 includes returning, by the cloud system, a response to the authentication request to the router, wherein the response includes internet domains and connection bandwidths the wireless device is allowed to use. A fifth step 450 includes preconfiguring the cloud system with the credentials that are also preconfigured in the wireless device.

As previously described, for an embodiment, the router is one of a plurality of routers that the wireless device is operable to attempt to associate with, and wherein the plurality of routers that wireless device is operable to associate with is adaptively updated at the wireless device.

As previously described, for an embodiment, the router is one of a plurality of routers that the wireless device is allowed to authenticate against, and wherein the plurality of routers that the wireless device is allowed to authenticate against is adaptively updated in the cloud system.

As previously described, an embodiment further includes preconfiguring the internet domains and the connection bandwidths into the cloud system.

As previously described, for an embodiment, the credentials comprise a pre-shared key or a digital certificate. As previously described, for an embodiment the credentials are stored on non-volatile memory.

As previously described, for an embodiment the connection bandwidths includes at least one of upstream bandwidth, downstream bandwidth, total time on network or aggregate bandwidth over a period of time. As previously described, for an embodiment, the connection bandwidths is adaptively adjusted.

As previously described, for an embodiment, the cloud system is preconfigured to accept authentication requests from the router.

As previously described, for an embodiment, the router is configured to send the authentication request to the cloud system.

An embodiment includes a program storage device readable by a machine of a cloud system, tangibly embodying a non-transitory program of instructions that when executed by the machine of the cloud system cause the machine to perform a method of connecting a wireless device to a network. For an embodiment, the method includes receiving, by a cloud system, an authentication request from a router, wherein the router received the authentication request from the wireless device, wherein the authentication request was automatically requested by the wireless device, and returning, by the cloud system, a response to the authentication request to the router, wherein the response includes internet domains and connection bandwidths the wireless device is allowed to use.

For an embodiment, the router is one of a plurality of routers that the wireless device is operable to attempt to associate with, and wherein the plurality of routers that wireless device is operable to associate with is adaptively updated at the wireless device. For an embodiment, the router is one of a plurality of routers that the wireless device is allowed to authenticate against, and wherein the plurality of routers that the wireless device is allowed to authenticate against is adaptively updated in the cloud system.

Although specific embodiments have been described and illustrated, the embodiments are not to be limited to the specific forms or arrangements of parts so described and illustrated.

What is claimed:

1. A method for connecting a wireless device to a network, comprising:
   automatically associating, by the wireless device, to a cloud system through a router;
   retrieving, by the wireless device, after automatically associating, a list of approved networks from a cloud service of the cloud system, wherein the list of approved networks includes a prioritization of the approved networks;
   scanning, by the wireless device, a local wireless environment;
   comparing, by the wireless device, a list of available networks advertised from nearby routers from the scan of a local wireless environment with the list of approved networks when the wireless device is looking for networks to join;

choosing, by the wireless device, an available network from the list of available networks advertised based at least in part on the comparing and the prioritization of the approved networks; and prioritizing, by the wireless device, a secure personal network, but opting to use the network which is authorized by the cloud service of the cloud system if network performance of the secure personal network falls below a threshold level.

2. The method of claim 1, wherein choosing, by the wireless device, the available network comprises choosing a highest priority network that is available to be joined.

3. The method of claim 1, wherein after automatically associating with the cloud system, the wireless device receives connection bandwidths the wireless device is allowed to use, wherein the connection bandwidths includes at least one of upstream bandwidth, downstream bandwidth, total time on network or aggregate bandwidth over a period of time.

4. The method of claim 1, wherein after automatically associating with the cloud system, the wireless device receives connection bandwidths the wireless device is allowed to use, wherein the connection bandwidths are adaptively adjusted.

5. The method of claim 4, wherein the connection bandwidths are adaptively adjusted based on one or more of business agreements, available bandwidth, a service level agreed with a device manufacturer, a service level agreed with a router operator, a service level agreed with an interne service subscriber, a time of day, an amount of data the wireless device has already used, historical data usage of the wireless device.

6. The method of claim 1, wherein the router is one of a plurality of routers that the wireless device is operable to attempt to associate with, and wherein the plurality of routers that wireless device is operable to associate with is adaptively updated at the wireless device.

7. The method of claim 1, wherein the router is one of a plurality of routers that the wireless device is allowed to authenticate against, and wherein the plurality of routers that the wireless device is allowed to authenticate against is adaptively updated in the cloud system.

8. A wireless device, comprising:
a wireless interface;
a controller, the controller operative to:
automatically associate to a cloud system through a router;
retrieve after automatically associating, a list of approved networks from a cloud service of the cloud system, wherein the list of approved networks includes a prioritization of the approved networks;
scan a local wireless environment;
compare a list of available networks advertised from nearby routers from the scan of a local wireless environment with the list of approved networks when the wireless device is looking for networks to join;
choose an available network from the list of available networks advertised based at least in part on the comparing and the prioritization of the approved networks; and
prioritize a secure personal network, but opting to use the network which is authorized by the cloud service of the cloud system if network performance of the secure personal network falls below a threshold level.

9. The wireless device of claim 8, wherein choosing the available network comprises choosing a highest priority network that is available to be joined.

10. The wireless device of claim 8, wherein the response further includes connection bandwidths the wireless device is allowed to use, wherein the connection bandwidths includes at least one of upstream bandwidth, downstream bandwidth, total time on network or aggregate bandwidth over a period of time.

11. The wireless device of claim 8, wherein the response further includes connection bandwidths the wireless device is allowed to use, wherein the connection bandwidths are adaptively adjusted.

12. The wireless device of claim 11, wherein the connection bandwidths are adaptively adjusted based on one or more of business agreements, available bandwidth, a service level agreed with a device manufacturer, a service level agreed with a router operator, a service level agreed with an internet service subscriber, a time of day, an amount of data the wireless device has already used, historical data usage of the wireless device.

13. The wireless device of claim 8, wherein the router is one of a plurality of routers that the wireless device is operable to attempt to associate with, and wherein the plurality of routers that wireless device is operable to associate with is adaptively updated at the wireless device.

14. The wireless device of claim 8, wherein the router is one of a plurality of routers that the wireless device is allowed to authenticate against, and wherein the plurality of routers that the wireless device is allowed to authenticate against is adaptively updated in the cloud system.

15. A method for connecting a wireless device to a network, comprising:
automatically associating, by the wireless device, to a cloud system through a router;
retrieving, by the wireless device, after automatically associating, a list of approved networks from a cloud service of the cloud system, wherein the list of approved networks includes a prioritization of the approved networks;
scanning, by the wireless device, a local wireless environment;
comparing, by the wireless device, a list of available networks advertised from nearby routers from the scan of a local wireless environment with the list of approved networks when the wireless device is looking for networks to join;
choosing, by the wireless device, an available network from the list of available networks advertised based at least in part on the comparing and the prioritization of the approved networks;
selecting, by the wireless device, to send at least some data on a secure personal network, and send at least some other data on the authorized network;
dynamically partitioning, by the wireless device, between the sending of the at least some data on the secure personal network, and the sending the at least some other data on the network authorized by the cloud service of the cloud system.

16. A wireless device, comprising:
a wireless interface;
a controller, the controller operative to:
automatically associate to a cloud system through a router;
retrieve after automatically associating, a list of approved networks from a cloud service of the cloud system, wherein the list of approved networks includes a prioritization of the approved networks;
scan a local wireless environment;

compare a list of available networks advertised from nearby routers from the scan of a local wireless environment with the list of approved networks when the wireless device is looking for networks to join;

choose an available network from the list of available networks advertised based at least in part on the comparing and the prioritization of the approved networks;

select to send at least some data on a secure personal network, and send at least some other data on the network which is authorized by the cloud service of the cloud system; and dynamically partition between the sending of the at least some data on the secure personal network, and the send the at least some other data on the network authorized by the cloud service of the cloud system.

* * * * *